July 29, 1969  H. L. WHITEHOUSE  3,458,210
TOOL RETAINER
Filed May 24, 1965

INVENTOR.
HUGH L. WHITEHOUSE
BY
Lindsey, Prutzman and Hayes
ATTORNEYS

United States Patent Office 3,458,210
Patented July 29, 1969

3,458,210
TOOL RETAINER
Hugh L. Whitehouse, South Euclid, Ohio, assignor to The Stanley Works, New Britain, Conn., a corporation of Connecticut
Filed May 24, 1965, Ser. No. 458,094
Int. Cl. A01b 1/22; B25g 3/22; B23b 31/00
U.S. Cl. 279—19.5      3 Claims

ABSTRACT OF THE DISCLOSURE

The device of this invention comprises a spring steel sleeve in close fitting engagement with a tool holder and having a plurality of apertures spaced apart and engageable with a locking ball for selectively retaining it in operating and release positions relative to a reciprocable tool of the tool holder, the sleeve being split to provide a pair of outwardly turned flanges for unwrapping the sleeve in a desired circumferential direction to effect expansion of the sleeve and reduction of its spring holding force for selectively positioning the sleeve relative to the holder.

---

This invention relates to tool holders and particularly concerns quick change tool holders that are manually manipulated to engage and release the shank of a tool.

A primary object of the present invention is the provision of a tool holder providing improved ease and convenience of operation for use in an apparatus such as an air operated percussive type tool. Included in this object is the aim of providing a tool holder having an improved retaining device for holding the shank of a tool in an operating position in the tool holder as well as for releasing the tool to quickly and easily change tools.

Another object of the present invention is to provide an improved retaining device that is easy to assemble on a tool holder, is manufactured at low cost, and is durable to give long, reliable service under rugged operating conditions.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

Figure 1:
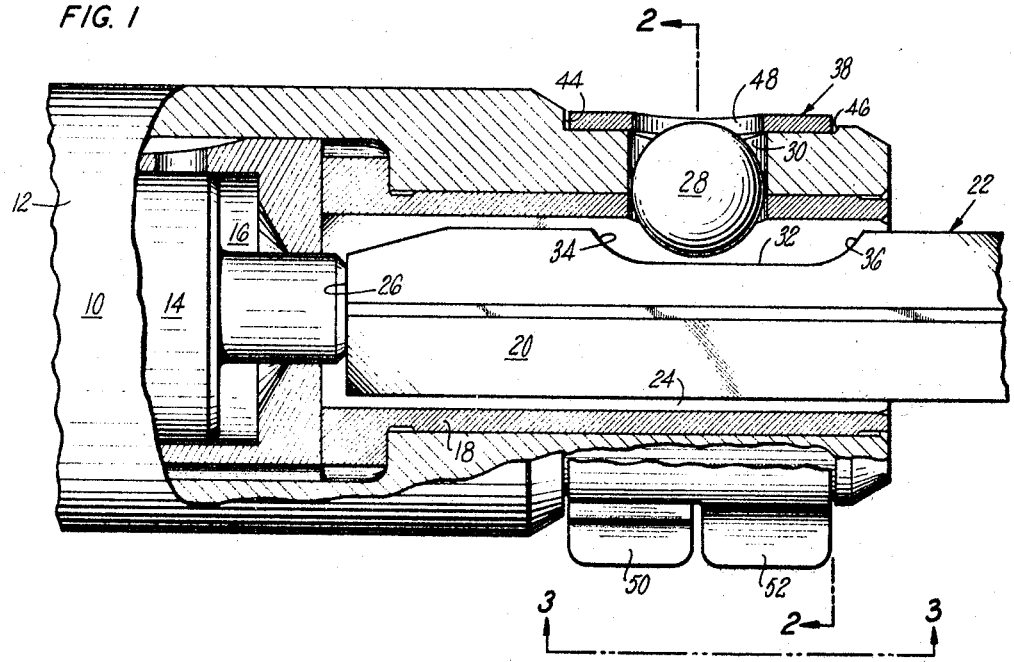
FIG. 1 is a side view, partly broken away and partly in section, of a tool holder incorporating a preferred embodiment of the present invention.
Figures 2, 3:
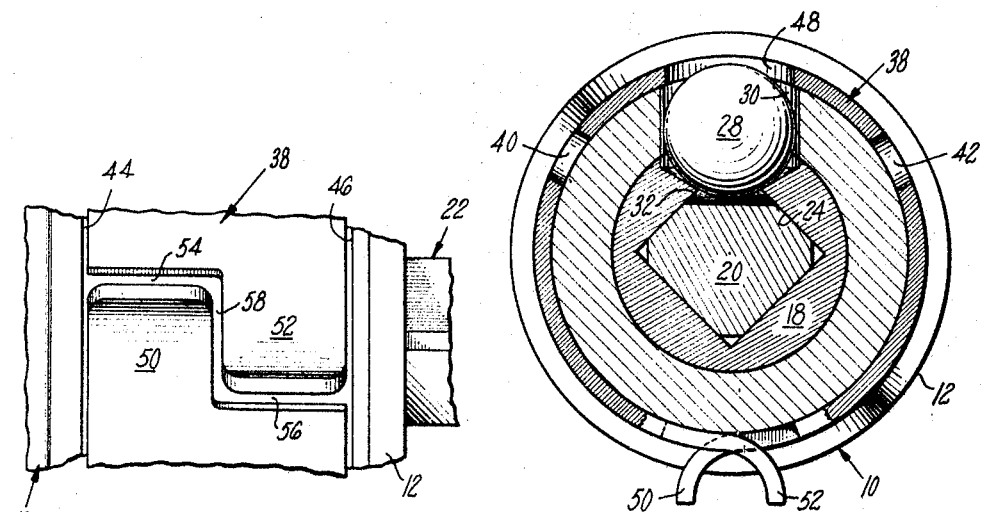
FIG. 2 is a section view taken generally along line 2—2 of FIG. 1.
FIG. 3 is an enlarged fragmentary view taken along line 3—3 of FIG. 1.

Referring now in detail to the drawing, a tool holder 10 is illustrated as comprising a cylindrical housing 12 having a piston 14 reciprocably mounted in a chamber 16 formed in coaxial alignment behind a bushing 18 which is inserted and secured in any suitable manner within the forward end of housing 12. It will be understood that the piston 14 may be air operated by a motor (not shown) at the rear of the housing 12.

The shank 20 of a detachable tool 22 is received within an elongated guideway 24 formed in the bushing 18, and a rear shoulder 26 of the tool shank is positioned to receive hard, rapid blows delivered by the piston. The guideway 24 is illustrated as having a square cross section generally conforming with the shape of the tool shank to provide bearing support for its longitudinal movement within the guideway and also to prevent the tool 22 from rotating relative to the housing 12.

The tool 22 is prevented from flying out of the tool holder 10 under the hammering blows of piston 14 by a ball 28. The ball is fitted in part in a lateral opening or ballway 30 communicating with the guideway 24 and extending transversely to its longitudinal axis through the bushing 18 and housing 12. The bottom of the ballway 30 is reduced in size to keep the ball 28 from reaching the flat surface 32 of a notch formed in the tool shank 20. The tool 22 is retained in the tool holder 10 by a segment of the ball 28 which projects into the guideway 24 between shoulders 34 and 36 at opposite ends of the notch in the tool shank, and the diametrically opposed segment of the ball 28 protrudes from the housing 12.

To hold the ball 28 in an operating position in the ballway 30, a retaining sleeve or collar 38 is rotatably mounted on the housing 12 and is provided with a pair of small detent holes or apertures 40 and 42 illustrated as being angularly spaced apart at approximately 120° for selective engagement with the protruding segment of the ball. The sleeve 38 is formed of a durable, resilient material, such as spring steel providing a force sufficient to keep the ball in an operating position such that it engages the shoulder 34 of the tool shank 20 to limit forward travel of the tool 22 in respect to the housing 12. With the ball in one of the apertures 40, 42, the sleeve is fixed against unintended rotation relative to the housing 12, and the annular shoulders 44 and 46 on the outside of housing 12 adjacent opposite edges of the sleeve 38 prevent it from moving longitudinally on the tool holder.

An opening 48 is formed in sleeve 38 equidistant between the apertures 40 and 42 such that they are both displaced approximately 60° from the opening 48. The diameter of the opening 48 is greater than that of the apertures 40, 42 but less than the diameter of the ball 28. The ball then may be removed from the notch in tool shank 20 into a release position within the opening 48 so that the tool 22 may be withdrawn from the guideway 24 and a new tool inserted as desired. Since the opening 48 is of smaller diameter than the ball 28, the ball will be retained within the ballway 30 and will not competely emerge from the housing 12.

To make the sleeve 38 particularly easy to manipulate, the sleeve is split by a stepped cut laterally extending between the edges of the sleeve to provide a pair of mating flanges 50 and 52 positioned generally opposite the opening 48. In the specific illustrated embodiment of the invention a pair of spaced slots 54 and 56 are formed in the sleeve to extend in an axial direction halfway inwardly from opposite edges of the sleeve 38 and a third slot 58 extends in a circumferential direction to join the inner ends of slots 54 and 56, thereby to provide the mating flanges 50 and 52 with free ends directed respectively in opposite directions.

The flanges 50 and 52 are turned outwardly from the sleeve 38, and the free ends are spaced apart a predetermined distance so that upon bringing them into alignment with one another by pliers, for example, the sleeve 38 expands to permit easy assembly on tool holder 10. Upon releasing the flanges, the sleeve will spring back without taking a permanent set and effectively grip the periphery of housing 12. The sleeve 38 may be operated to selectively register the apertures 40, 42 and the opening 48 with the ballway 30 of the tool holder 10 simply by applying finger pressure against the spring force on that flange which will unwrap the sleeve and rotate it in the desired direction. When the opening 48 is aligned with the ballway 30, the ball 28 may be shifted from a release position to an operating position by simply rotating the sleeve 38 either clockwise or counterclockwise, whichever is more convenient, through a relatively small angle to positively retain the tool in the tool holder.

As will be apparent to persons skilled in the art, various modifications and adaptations of the structure above described will become readily apparent without departure from the spirit and scope of the invention, the scope of which is defined in the appended claims.

I claim:

1. An easily releasable tool retainer engageable with a locking member of a holder for an air operated tool and the like and comprising a closely fitted split spring sleeve gripping the holder with hoop tension to resist radial displacement therefrom and having aperture means registrable with the locking member in an operating position wherein the locking member and the sleeve are mutually locked against rotation relative to the holder ensuring engagement of the locking member with the tool, and in a release position wherein the locking member is disengaged from the tool for removing it from the holder, the sleeve having a pair of outwardly turned flanges circumferentially overlapping in side-by-side relation to effect expansion of the sleeve and reduction of its spring holding force upon drawing the flanges together and unwrapping the sleeve in a desired circumferential direction to facilitate selective registration of the aperture means with the locking member.

2. The spring sleeve of claim 1 wherein the aperture means comprises a pair of holes spaced apart and engageable with the locking member to positively lock the sleeve against rotation relative to the housing with the locking member in operating position, and an opening of enlarged size relative to said pair of holes and formed intermediate the same for receiving the locking member in release position such that the spring sleeve may be selectively turned in either circumferential direction through a small angle for locking and releasing the locking member.

3. The spring sleeve of claim 1 wherein the flanges have free ends extending in opposite directions and spaced apart a predetermined distance in noninterfering relation to permit the free ends of the flanges to be moved past one another upon expansion of the split sleeve to effect facile positioning of the sleeve as well as assembly and disassembly thereof relative to the holder.

References Cited

UNITED STATES PATENTS

| 688,860 | 12/1901 | Kay et al. | 287—119 X |
| 2,716,393 | 8/1955 | Fischer | 279—19.5 |
| 2,854,238 | 9/1958 | Kennell | 279—19.5 |

FOREIGN PATENTS 461,048 2/1937 Great Britain.

ROBERT C. RIORDON, Primary Examiner

U.S. Cl. X.R.

285—277